(12) United States Patent
Del Sarto et al.

(10) Patent No.: US 7,116,525 B2
(45) Date of Patent: Oct. 3, 2006

(54) READ/WRITE ASSEMBLY FOR MAGNETIC HARD DISKS

(75) Inventors: Marco Del Sarto, Massa (IT); Mauro Marchi, Milan (IT); Lorenzo Baldo, Bareggio (IT); Simone Sassolini, Sansepolcro (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 377 days.

(21) Appl. No.: 10/429,266

(22) Filed: May 2, 2003

(65) Prior Publication Data
US 2003/0235013 A1    Dec. 25, 2003

(30) Foreign Application Priority Data
May 3, 2002    (EP)    .................................. 02425276

(51) Int. Cl.
*G11B 5/56*    (2006.01)
(52) U.S. Cl. .................................. 360/294.3
(58) Field of Classification Search ............ 360/294.3, 360/245.2, 245.3
See application file for complete search history.

(56) References Cited
U.S. PATENT DOCUMENTS 3,789,378 A    1/1974  Bonzano et al.
5,438,469 A    8/1995  Rudi
5,521,778 A    5/1996  Boutaghou et al.
5,657,188 A    8/1997  Jurgensen et al.
6,501,623 B1 *  12/2002  Sassolini et al. ......... 360/245.3

FOREIGN PATENT DOCUMENTS

EP    0840291 A2    5/1998
EP    0977180 A1    2/2000

OTHER PUBLICATIONS

Imamura T et al: Transverse Mode Electrostatic Microactuator for Mems-Bases HDD Slider; proceedings of the 9 th annual International workshop of Micro Elec Mechanical Systems, Investigationof Micro Structures, Sensors, Actuators, Machines and Systems, Sand Diego CA Feb. 11-15, 1996 Institute of Electricaland Electronics Engineers.

* cited by examiner

*Primary Examiner*—Angel Castro
(74) *Attorney, Agent, or Firm*—Lisa K. Jorgenson; Bryan A. Santarelli; Graybeal Jackson Haley LLP

(57) ABSTRACT

A read/write assembly for magnetic hard disks includes at least: one supporting element; one read/write (R/W) transducer; one micro-actuator, set between the R/W transducer and the supporting element; one electrical-connection structure for connection to a remote device carried by the supporting element and connected to the R/W transducer and to the micro-actuator. In addition, a protective structure, set so as to cover the micro-actuator is made of a single piece with the electrical-connection structure.

27 Claims, 4 Drawing Sheets

READ/WRITE ASSEMBLY FOR MAGNETIC HARD DISKS

PRIORITY CLAIM

This application claims priority from European patent application No. 02425276.9, filed May 3, 2002, which is incorporated herein by reference.

TECHNICAL FIELD

The present invention relates generally to a read/write assembly for data disks.

BACKGROUND

As is known, in currently available hard disks, dual-stage actuator systems for positioning of the read/write heads are provided. The first actuation stage generally comprises a supporting body (normally referred to as "E-block", owing to the fact that, in side view, it is E-shaped), which is driven by a motor (also called "voice-coil motor") and is equipped with arms to which a plurality of suspensions are fixed cantilevered. Each suspension is provided, at one of its free ends, with a joint or "gimbal", formed starting from the suspension itself as a thin plate cut out on three and a half sides. Finally, on each gimbal a respective read/write (R/W) transducer (or "slider") is carried, which, in use, is set facing one surface of a magnetic disk. The first actuation stage enables a coarse search to be carried out of the tracks to be read or written. In particular, the precision in the search depends upon the mechanical assembly forming the first actuation stage.

For each slider, the second actuation stage comprises a micro-actuator, normally of a rotary type, set between the slider itself and the gimbal. The micro-actuator is controlled by signals supplied by electronic control devices (not illustrated herein), set at a distance on cards located inside a hard disk casing, and enables a finer control of the position of the slider during tracking.

As is known, the micro-actuator comprises a fixed body (stator), which is bonded to the gimbal, and a mobile mass (rotor), to which the slider is fixed. The stator and the rotor, which are made of an adequately doped semiconductor material, are connected together so that they can move angularly by means of elastic elements (springs) and have a plurality of comb-fingered stator and rotor arms.

Clearly, it is very important to protect the micro-actuator during use, in order to prevent foreign bodies, such as dust or fragments of material which have come away from one of the disks, from penetrating between the stator and the rotor, thus damaging them. For this purpose, a known solution is providing protective structures (caps) for encapsulating the micro-actuator, as is described, for instance, in the European patent application No. EP-A-1122720, filed on Feb. 2, 2000 in the name of the present applicant, and incorporated by reference. According to the above patent application, a micro-actuator is made in a first wafer of semiconductor material, which is bonded to a second wafer of semiconductor material and houses driving circuits for the micro-actuator itself. The micro-actuator, and in particular, the rotor and stator arms, are made in a portion of the first wafer, which, after bonding, faces the second wafer and hence is not directly accessible from outside. Furthermore, the first wafer comprises an encapsulating structure, which surrounds the micro-actuator at the sides and on a side opposite to the second wafer.

The known solutions do, however, present some limits. In fact, even though the protection against intrusion of foreign bodies is satisfactory, the processes of fabrication of encapsulated microstructures are complex and involve execution of numerous working steps, which are not standard in microelectronics, with a consequent non-optimal yield. Known micro-actuators hence have a very high production cost. Furthermore, given that they have a complex structure, they are easily subject to failure both during fabrication and during use. It would, instead, be desirable to have micro-actuators with simpler structures,—that are, for example, more compact and also more reliable.

SUMMARY

One embodiment of the present invention is a read/write assembly that does not present the drawbacks described above.

BRIEF DESCRIPTION OF THE DRAWINGS

For an understanding of the present invention, some preferred embodiments are now described, purely by way of non-limiting example, with reference to the attached drawings, in which.

DETAILED DESCRIPTION

Figure 1:
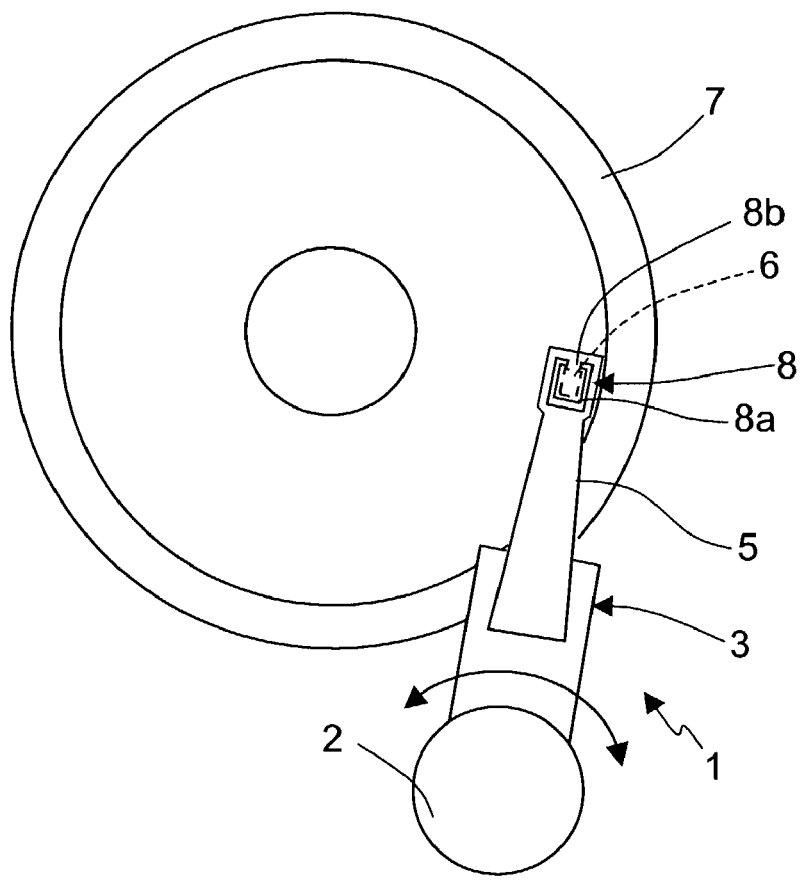
FIG. 1 is a top plan view of a read/write assembly for magnetic hard disks according to an embodiment of the invention.
Figure 2:
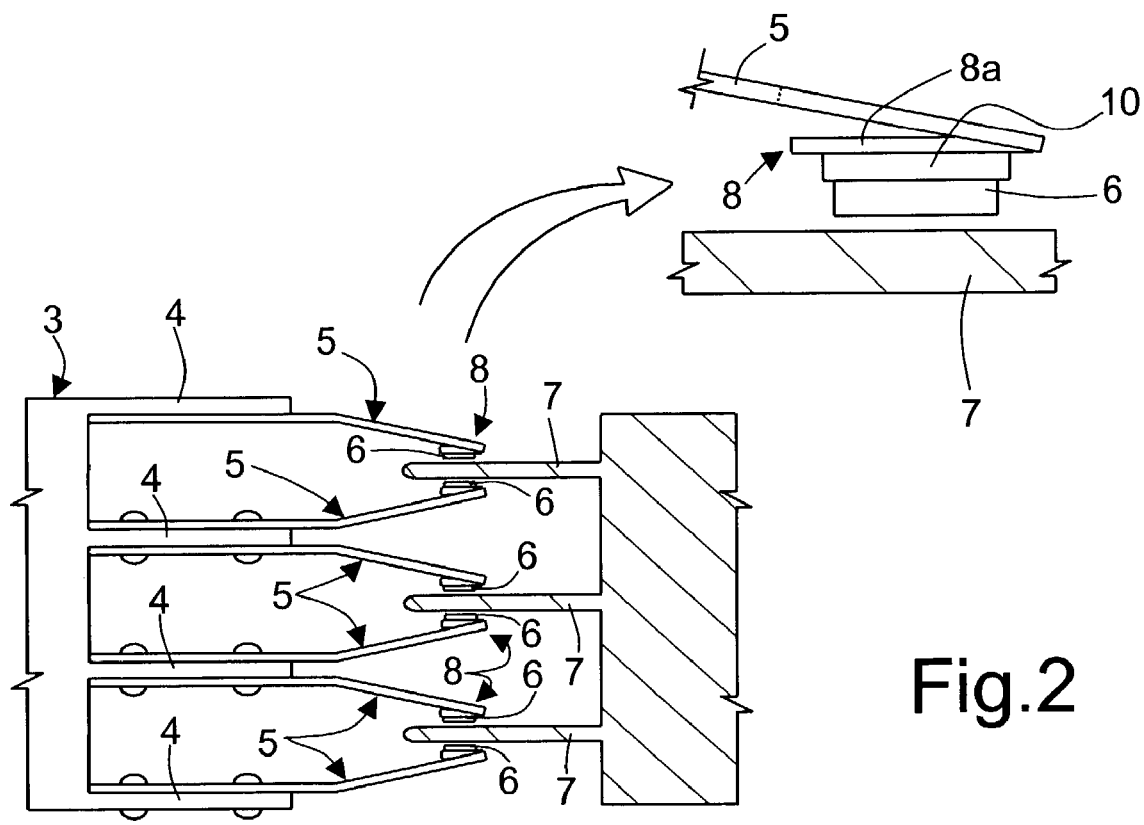
FIG. 2 is a longitudinally sectioned side view of the read/write assembly of FIG. 1 according to an embodiment of the invention.
Figure 3:
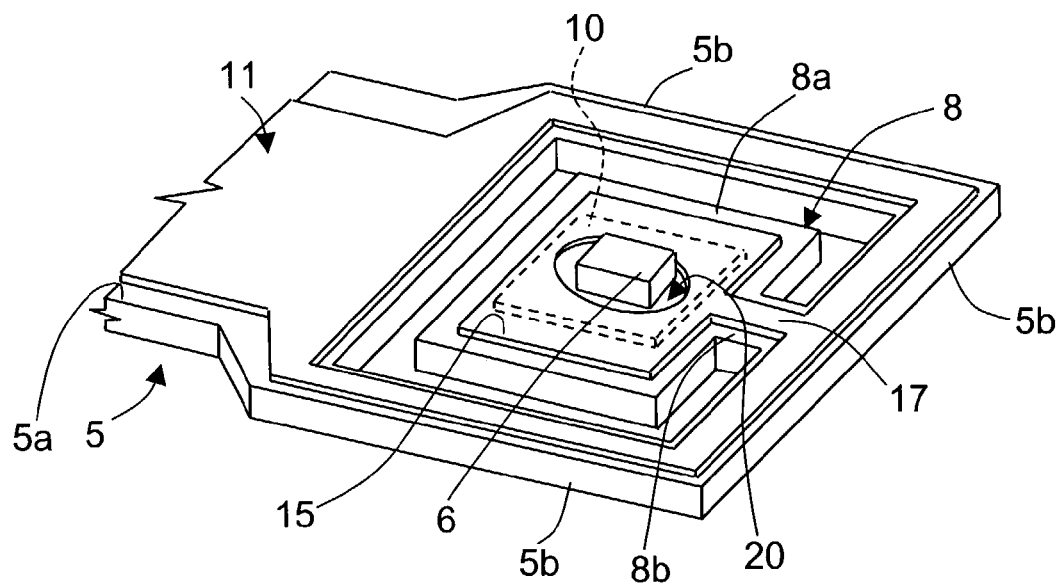
FIG. 3 is a simplified view of a detail of the assembly of FIG. 1, implementing a first embodiment of the present invention.

Referring to FIGS. 1 to 3, number 1 designates a read/write assembly with dual-actuation stage for a hard disk. The assembly 1 is of a rotary type and comprises a motor 2 (also called "voice-coil motor") fixed to a supporting body 3, generally referred to as "E-block", owing to the fact that, in side view, it is E-shaped (see FIG. 2). The supporting body 3 has a plurality of arms 4, each bearing a suspension 5 formed by a cantilevered fixed thin plate. Each suspension 5 carries, at its end that is not fixed to the supporting body 3, a read/write (R/W) transducer 6, which is set (in an operative condition) facing one surface of a hard disk 7 and is able to perform rolling and pitching movements in order to follow the surface of the hard disk 7. For this purpose the R/W transducer 6 (also referred to as "slider") is fixed to a joint (also referred to as "gimbal" or "flexure") 8, generally formed by the suspension 5 itself and constituted by, for example, a rectangular chip 8a, which is cut out on three and a half sides, starting from the lamina of the suspension 5, and the portion 8b, which for connection to the suspension 5 enables bending of the chip 8a under the weight of the slider 6 (see FIG. 2). A micro-actuator 10 is set between the gimbal 8 and the slider 6, as may be seen in FIG. 3, which shows the end of the suspension 5, the gimbal 8, the slider 6 and the micro-actuator 10, which in this case is of a rotary type. FIG. 3 also shows a portion of a structure 11 for electrical connection, the said structure being carried by the suspension 5 and connecting the R/W transducer 6 and the micro-actuator 10 to a remote control device (known and not illustrated herein).

Figure 4:
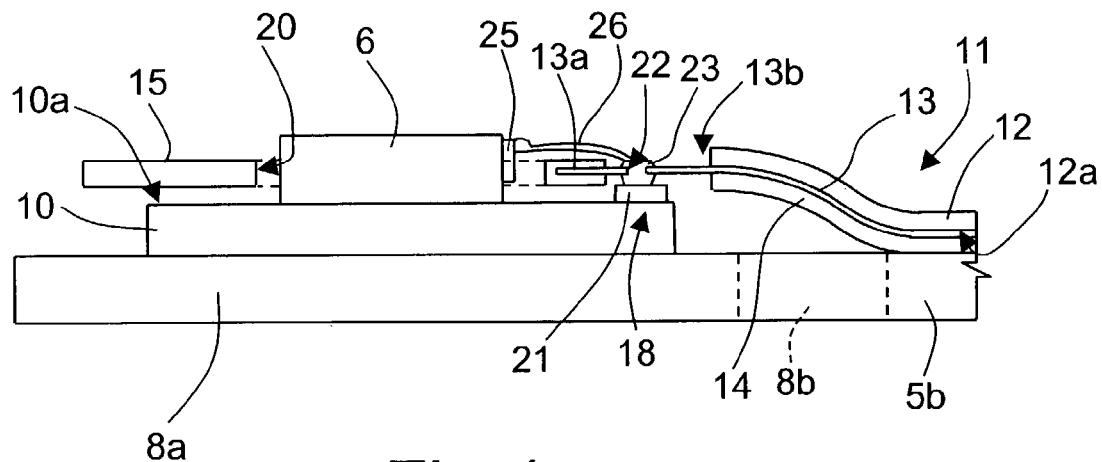
FIG. 4 is a longitudinally sectioned side view of the detail of FIG. 3 according to the first embodiment of the invention.
Figure 5:
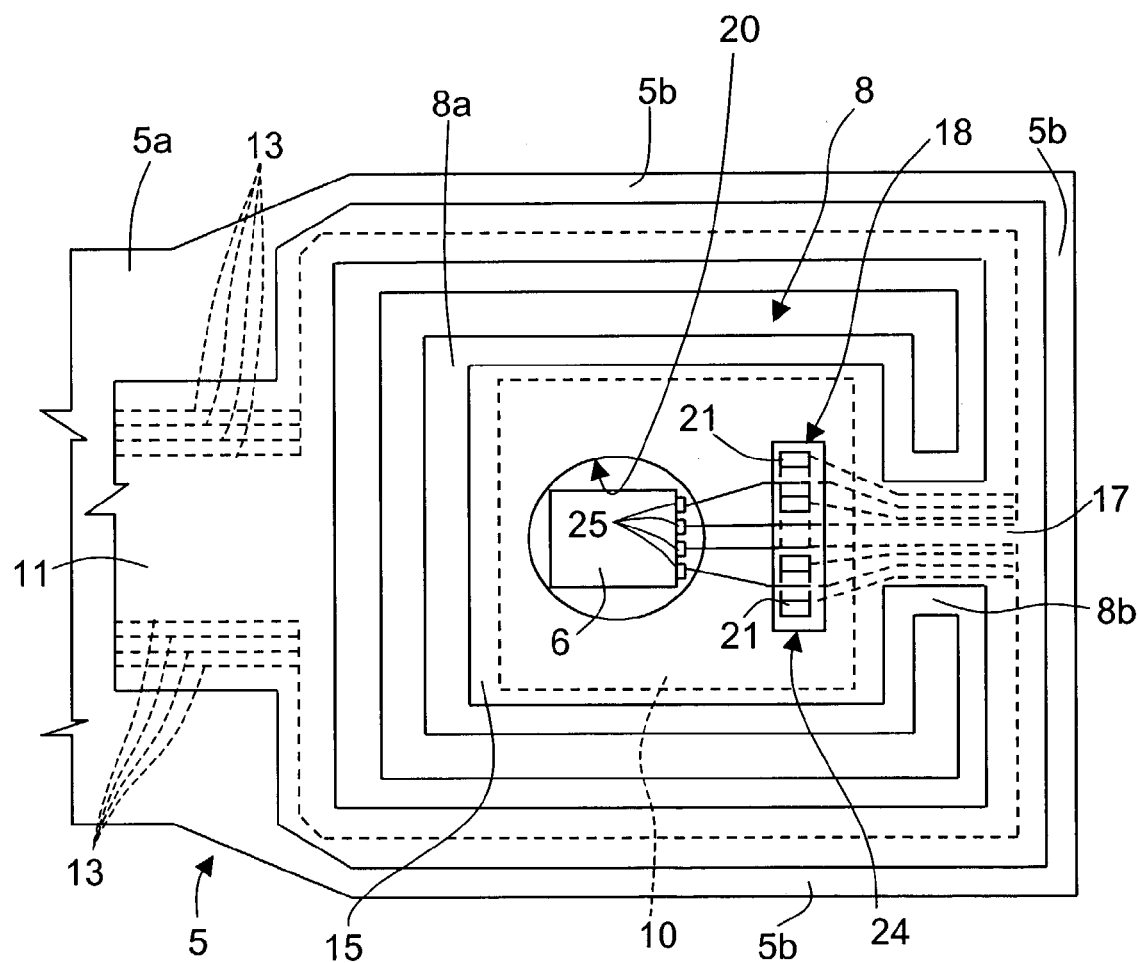
FIG. 5 is a top plan view of the detail of FIG. 3 according to the first embodiment of the invention.

Referring to FIGS. 4 and 5, the structure 11 for electrical connection comprises a supporting film 12 made of polymeric material, a plurality of conductive paths 13 made on a surface 12a of the film 12 facing the suspension 5, and a passivation layer 14 coating the conductive paths 13. In addition, a protective structure 15 set for covering the micro-actuator 10, is made of a single piece with the structure 11 for electrical connection, in particular, as an extension of the film 12 towards the chip 8a, and incorporates ends 13a of the conductive paths 13. In greater detail, the film 12 and the conductive paths 13 of the electrical-connection structure 11 develop along an arm 5a and edges 5b of the suspension 5, from which the chip 8a has been cut out (see FIG. 3). The conductive paths 13 are prolonged inside a connection portion 17 of the electrical-connection structure 11 that is set above the connection portion 8b which joins the chip 8a to the suspension 5. The protective structure 15 is made at one end of the connection portion 17, is anchored to an anchorage and connection region 18 of the micro-actuator 10, as explained later, and extends substantially parallel to a free face 10a of the micro-actuator 10, at a distance. The protective structure 15 is, in practice, a rectangular-shaped thin plate placed over the free face 10a of the micro-actuator 10. In addition, the protective structure 15 has, in a central position, an opening 20, through which the R/W transducer 6 is placed. In this way, the protective structure 15 prevents any penetration of dust or any other particles into the micro-actuator 10, but does not hinder movement of the micro-actuator 10 itself, and consequently enables fine positioning of the R/W transducer 6 during the tracking stage.

Still referring to FIGS. 4 and 5, in an area corresponding to the region of anchorage and connection 18 of the micro-actuator 10, which comprises a plurality of control pads 21 made of conductive material, the protective structure 15 has a connection window 24 uncovering respective sections 13b for anchorage of the conductive paths 13, the said sections being locally without film 12 and without the passivation layer 14. Furthermore, in the uncovered anchorage sections 13b there are made respective holes 22. The anchorage sections 13b of the conductive paths 13 to be connected to the micro-actuator 10 are bonded to respective control pads 21 by local deposition of drops 23 of bonding material, which pass through respective holes 22 (according to the technique known as "zero-force bonding"). Alternatively, bonding may be carried out using the well-known techniques of ball bonding or stitch bonding.

Still referring to FIGS. 4 and 5, and according to the embodiment of the invention described herein, some of the conductive paths 13 are directly connected to respective read/write pads 25 of the R/W transducer 6 by means of wire connection lines 26 (wire-bonding technique). Alternatively, it is possible to provide read/write connections integrated in the micro-actuator 10: in this embodiment, the read/write pads 25 are made on the micro-actuator 10 in the proximity of the control pads 21, and the connection to the respective conductive pads 13 is made applying the techniques referred to above (zero-force bonding, ball bonding or stitch bonding).

From what has been presented above, advantages of this embodiment of the invention emerge clearly. In the first place, the protective structure 15 is made in an extremely simple way and is altogether separate from the micro-actuator 10. In particular, fabrication of the protective structure 15 does not involve additional fabrication steps, in so far as the said structure can be obtained simply by modifying the shape of the electrical-connection structure 11. Also the micro-actuator 10, which does not incorporate the protective structure 15, can be simplified. On the one hand, then, in order to fabricate the micro-actuator 10, a smaller number of fabrication steps and less complex steps are required; on the other hand, the overall dimensions of the micro-actuator 10 can be advantageously reduced.

Furthermore, the invention enables elimination of wire bonding between the electrical-connection structure 11 and the micro-actuator 10 and, possibly, also between the electrical-connection structure 11 and the R/W transducer 6. In this way, it is possible to build more compact assemblies and, in addition, the connection by means of direct bonding of the paths 13 is sturdier and more reliable than wire bonding.

Figure 6:
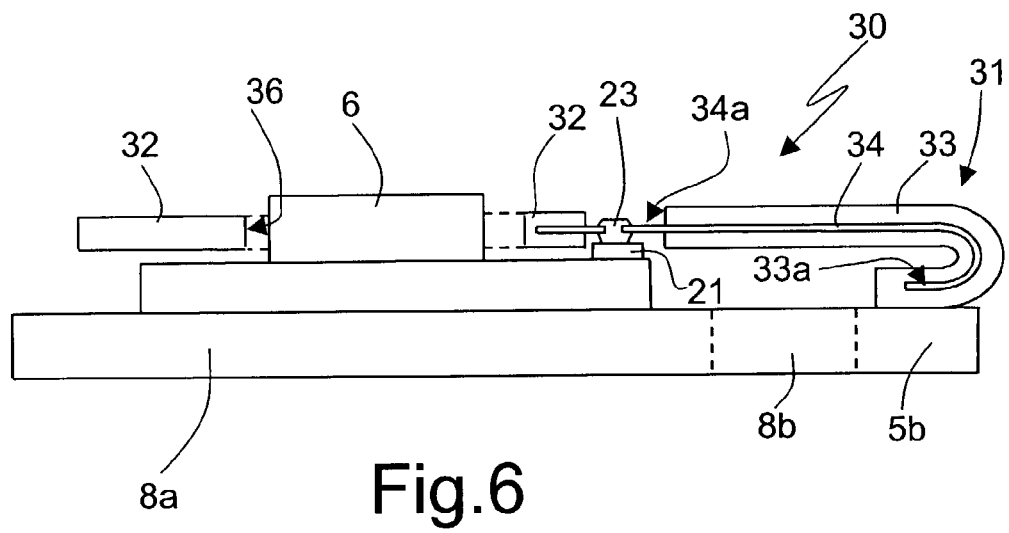
FIG. 6 is a longitudinally sectioned side view of a detail of the read/write assembly implementing a second embodiment of the present invention.
Figure 7:
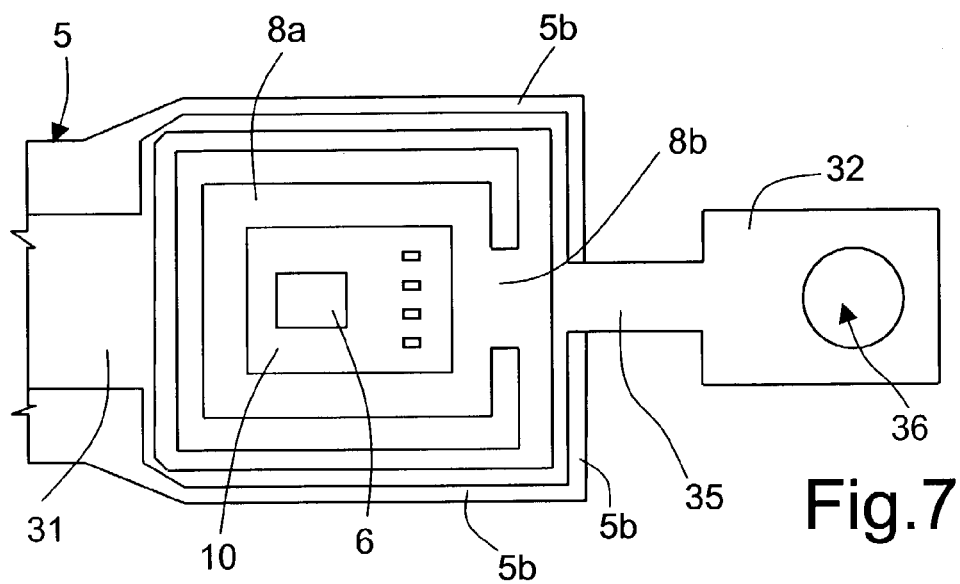
FIGS. 7 and 8 are top plan views of the detail of FIG. 6, respectively, in an assembly step and in use according to the second embodiment of the invention.
Figure 8:
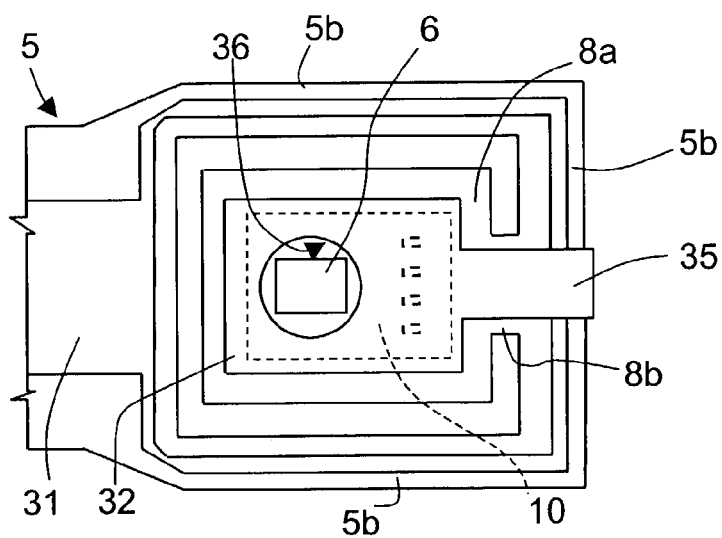

Referring to FIGS. 6 to 8, a second embodiment of the invention will now be described, in which parts that are the same as the ones already illustrated are designated by the same reference numbers. In particular, in addition to the motor 2 and to the supporting body 3 of FIG. 1, a read/write assembly 30 comprises the suspension 5, the gimbal 8, the R/W transducer 6, the micro-actuator 10, an electrical-connection structure 31, carried by the suspension 5, and a protective structure 32, which is made of a single piece with the electrical-connection structure 31. In this embodiment, the electrical-connection structure 31 comprises a supporting film 33 and a plurality of conductive paths 34 made on one face 33a of the film 33 opposite to the suspension 5. In addition, the protective structure 32 is formed by the film 33 and extends in a direction opposite to the chip 8a (see FIG. 7). In greater detail, the protective structure 32 is made at one end of a connection portion 35 and, during a step of bonding to the suspension 5, is projected longitudinally outwards in the same plane as the electrical-connection structure 31 (see FIG. 7). In use, the connection portion 35 is folded back in hinge-like fashion substantially through 180°, so that the protective structure 32 is set on top of the micro-actuator 10 (see FIGS. 7 and 8). Also in this case, the R/W transducer 6 is placed through a circular opening 36, made in the center of the protective structure 32. Furthermore, the connection between the electrical-connection structure 31, on the one hand, and the R/W transducer 6 and the micro-actuator 10, on the other hand, is made as explained above, with reference to FIGS. 4 and 5. In this case, in particular, uncovered sections 34a of the connection paths 34 are alternatively bonded to respective control pads 21 of the micro-actuator 10 or connected to read/write pads of the R/W transducer 6 by wire bonding.

Figure 9:
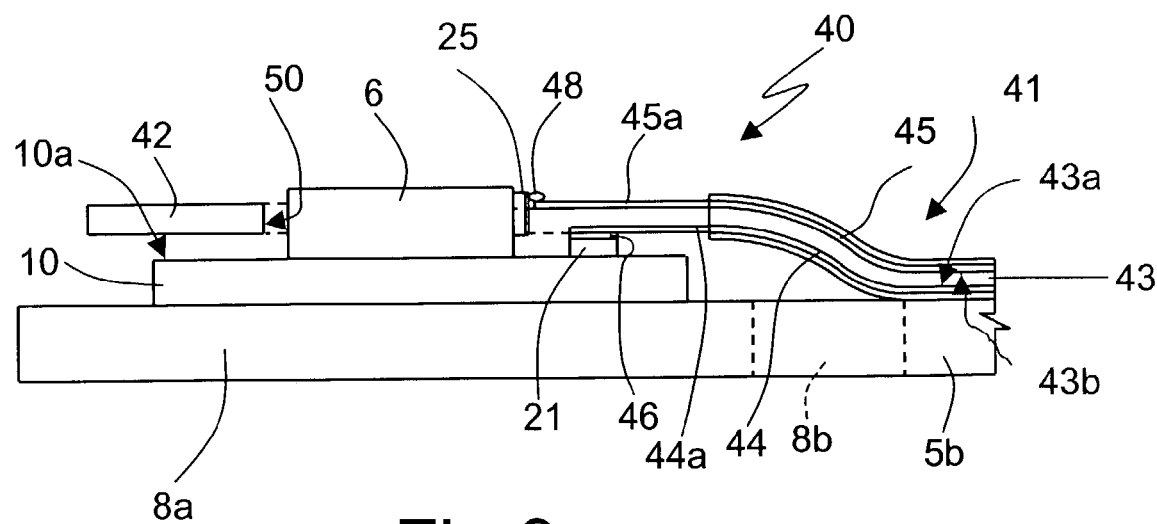
FIG. 9 is a longitudinally sectioned side view of a detail of a read/write assembly implementing a third embodiment of the present invention.

Referring to FIG. 9, according to a further embodiment of the invention, a read/write assembly 40 comprises, in addition to the motor 2 and the supporting body 3 of FIG. 1, the suspension 5, and the gimbal 8 of FIG. 2, the R/W transducer 6, the micro-actuator 10, an electrical-connection structure 41 carried by the suspension 5 of FIG. 3, and a protective structure 42 made of a single piece with the electrical-connection structure 41. The electrical-connection structure 41 comprises a supporting film 43 and is provided with control conductive paths 44 made on a first face 43*a* of the film 43 facing the suspension 50, and read/write conductive paths 45 made on a second face 43*b* of the film 43 opposite the first face 43*a*. In addition, the protective structure 42, which is made of a single piece with the electrical-connection structure 41 and is provided with an opening 50, is placed so as to cover the micro-actuator 10, so that the R/W transducer 6 is inserted through the opening 50. In this case, ends 44*a*, and 45*a*, respectively of the control conductive paths 44 and of the read/write conductive paths 45 are free for a predetermined length and are, moreover, suspended. In greater detail, the ends 44*a* of the control conductive paths are bonded to respective control pads 21 of the micro-actuator 10 by means of bonding layers 46; the ends 45*a* of the read/write conductive paths 45 are, instead, bonded to respective read/write pads 25 of the R/W transducer 6. In this case, in particular, drops 48 of bonding material are used.

Referring to FIG. 1 the read/write assembly 1 according to any of the above-described embodiments may be included in a disk drive such as a magnetic hard-disk drive. And such a disk drive may be included in an electronic system such as a computer system.

The embodiment described above enables a particularly flexible connection with the R/W transducer 6. Furthermore, given that the conductive paths are located on distinct planes and in pairs on top of one another, the overall dimensions of the electrical connection 41 are considerably reduced.

Finally, it is clear that numerous modifications and variations may be made to the read/write assembly for magnetic hard disks described and illustrated herein, all of which fall within the spirit and scope of the inventive idea.

What is claimed is:

1. A read/write assembly for magnetic hard disks comprising:
    a supporting element;
    a read/write (R/W) transducer;
    a micro-actuator, set between said R/W transducer and said supporting element;
    an electrical-connection structure for connection with a remote device, carried by said supporting element and connected to said R/W transducer and to said micro-actuator; and
    a protective structure, set so as to cover said micro-actuator;
    wherein said protective structure is made of a single piece with said electrical-connection structure.

2. The assembly according to claim 1, wherein said protective structure has centrally an opening, said R/W transducer being placed through said opening.

3. The assembly according to claim 1, wherein said protective structure extends substantially parallel to a face of said micro-actuator.

4. The assembly according to claim 1, wherein said electrical-connection structure comprises a film of dielectric material and a plurality of conductive paths provided on said film and in that said protective structure is a thin plate extending as a single piece from said film.

5. The assembly according to claim 4, wherein said micro-actuator comprises a region of anchorage and connection and in that said protective structure is bonded to said anchorage and connection region.

6. The assembly according to claim 5, wherein said anchorage and connection region comprises a plurality of control pads, said conductive paths being bonded to respective control pads.

7. The assembly according to claim 6, wherein said conductive paths have respective uncovered sections in areas corresponding to said control pads.

8. The assembly according to claim 6, wherein said conductive paths comprise control conductive paths made on a first face of said film facing said supporting element, and read/write conductive paths made on a second face of said film opposite to said first face.

9. The assembly according to claim 8, wherein respective ends respectively of said control conductive paths and of said read/write conductive paths are free for a pre-set length and are moreover suspended.

10. The assembly according to claim 9, wherein said ends of said control conductive paths are bonded to respective said control pads, and said ends of said read/write conductive paths are bonded to read/write pads of said R/W transducer.

11. The assembly according to claim 4, wherein said protective structure incorporates ends of said conductive paths.

12. The assembly according to claim 4, wherein said conductive paths are made on a face of said film facing said supporting element.

13. The assembly according to claim 4, wherein said protective structure is made at one end of a connection portion of said electrical-connection structure, which projects longitudinally outwards and is folded back in hinge-like fashion through substantially 180°.

14. The assembly according to claim 13, wherein said conductive paths are made on one face of said film opposite to said supporting element.

15. A read/write head assembly for a data disk, the assembly comprising:
    a support;
    an actuator having a first face coupled to the support and having a second face;
    a read/write head coupled to the second face of the actuator; and
    a protective structure coupled to the support, spaced from the second face of the actuator, and having an opening through which the read/write head protrudes.

16. The assembly of claim 15 wherein the protective structure comprises:
    a first conductor coupled to the actuator; and
    a second conductor coupled to the read/write head.

17. The assembly of claim 15 wherein:
    the actuator has a first signal pad;
    the read/write head has a second signal pad; and
    the protective structure has a first conductor that is coupled to the first signal pad and a second conductor that is coupled to the second signal pad.

18. The assembly of claim 17, further comprising:
    wherein the protective structure comprises a film made of polymeric material;
    wherein the first and second conductors are disposed on a first surface of the film facing the support; and
    a passivation layer disposed on the first and second conductors.

19. The assembly of claim 18 wherein the protective structure is folded substantially 180 degrees relative to the support where coupled to the support.

20. The assembly of claim 17 wherein:
    the protective structure comprises a film made of polymeric material;
    the first conductor is disposed on a first surface of the film facing the support; and the second conductor is disposed on a second surface of the film opposite to the first surface.

21. A disk drive, comprising:
a disk operable to store data; and
a read/write-head assembly, comprising,
a support,
an actuator having a first face coupled to the support and having a second face,
a read/write head coupled to the second face of the actuator and operable to read data from and write data to the disk, and
a protective structure coupled to the support, spaced from the second face of the actuator, and having an opening through which the read/write head protrudes.

22. An electronic system, comprising:
a disk drive, comprising,
a disk operable to store data, and
a read/write-head assembly, comprising,
a support,
an actuator having a first face coupled to the support and having a second face,
a read/write head coupled to the second face of the actuator and operable to read data from and write data to the disk, and
a protective structure coupled to the support, spaced from the second face of the actuator, and having an opening through which the read/write head protrudes.

23. A method, comprising:
attaching a first face of an actuator to a read/write-assembly support;
attaching a read/write transducer to a second face of the actuator such that the transducer is movable relative to the support; and
forming a protective structure a distance from the second face of the actuator, the protective structure having an opening that exposes the transducer.

24. The method of claim 23, further comprising:
forming first and second conductors on the protective structure;
coupling the first conductor to the actuator; and
coupling the second conductor to the transducer.

25. The method of claim 24 wherein:
forming the first and second conductors comprises forming the first and second conductors as respective paths on a first surface of the protective structure facing the support;
coupling the first conductor comprises depositing drops of bonding material to bond the first conductor path to a control pad on the actuator; and
coupling the second conductor comprises wiring the second conductor path to a read/write pad on the transducer.

26. The method of claim 24 wherein:
forming the first conductor comprises forming the first conductor as a path on a first surface of the protective structure facing the support;
forming the second conductor comprises forming the second conductor as a path on a second surface of the protective structure that is opposite to the first surface;
coupling the first conductor comprises bonding the first conductor path to a control pad on the actuator with a bonding layer; and
coupling the second conductor comprises depositing drops of bonding material to bond the second conductor path to a read/write pad on the transducer.

27. The method of claim 23, further comprising:
wherein forming the protective structure comprises forming the protective structure as an extension of a supporting film; and
folding the protective structure back substantially 180 degrees over the transducer.

* * * * *